US010083416B2

(12) United States Patent
Del Rosario et al.

(10) Patent No.: US 10,083,416 B2
(45) Date of Patent: Sep. 25, 2018

(54) TIME PHASE WORK POOL MANAGEMENT FOR RETURNED INVENTORY ASSET ROUTING

(75) Inventors: Francis E. Del Rosario, Rochester, MN (US); Kael B. Eddy, Lanesboro, MN (US); Clinton W. Erie, Adams, MN (US); Ivory W. Knipfer, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1465 days.

(21) Appl. No.: 12/130,953

(22) Filed: May 30, 2008

(65) Prior Publication Data

US 2009/0299881 A1 Dec. 3, 2009

(51) Int. Cl.
*G06Q 10/00* (2012.01)
*G06Q 30/00* (2012.01)
*G06Q 10/08* (2012.01)

(52) U.S. Cl.
CPC .................. *G06Q 10/087* (2013.01)

(58) Field of Classification Search
USPC .......................................................... 705/28
See application file for complete search history.

(56) References Cited

U.S. PATENT DOCUMENTS 5,099,431 A * 3/1992 Natarajan ............... H01L 22/20
257/E21.525

6,529,788 B1 * 3/2003 Tani .................. G06Q 10/0875
700/97

(Continued)

OTHER PUBLICATIONS

Zuluaga, Juan Pablo Soto; "Reverse Logistics: Models and Applications"; Department of Economics and Business; Graduate Program in Economics, Management and Finance; Universitat Pompeu Fabra; Oct. 2005.

(Continued)

*Primary Examiner* — Ashford S Hayles
(74) *Attorney, Agent, or Firm* — Steven M. Greenberg, Esq.; CRGO Law (57) ABSTRACT

Embodiments of the present routing returned inventory assets and provide a method, system and computer program product for routing items in a manufacturing environment. In an embodiment of the invention, a method for routing items in a manufacturing environment can be provided. The method can include defining attributes of work pools in the manufacturing environment, defining a set of reuse strategies for use in the manufacturing environment, receiving a returned inventory asset in the manufacturing environment and obtaining at least one attribute of the returned inventory asset, comparing the obtained at least one attribute of the returned inventory asset to the set of reuse strategies to select the reuse strategy to apply to the returned inventory asset and applying the selected reuse strategy to the returned inventory asset to assign the returned inventory asset to one of the work pools in the manufacturing environment. The method can further include the transportation of the returned inventory asset to a temporary location other than the assigned work pool, and can include updating a returned inventory asset tracking record to indicate the assigned work pool.

16 Claims, 8 Drawing Sheets

(56) References Cited

U.S. PATENT DOCUMENTS

| | | | | |
|---|---|---|---|---|
| 7,058,587 B1* | 6/2006 | Horne | G06Q 10/06 | 705/7.22 |
| 7,580,860 B2* | 8/2009 | Junger | G06Q 10/083 | 235/376 |
| 7,716,091 B2* | 5/2010 | Ross | G06Q 10/087 | 235/383 |
| 7,792,886 B2* | 9/2010 | Hadari | G06Q 10/087 | 707/790 |
| 7,930,223 B2* | 4/2011 | Wang | G06Q 10/08 | 705/28 |
| 2001/0029461 A1* | 10/2001 | Kobayashi | G06Q 10/06 | 705/7.12 |
| 2001/0034673 A1* | 10/2001 | Yang | G06Q 10/06311 | 705/28 |
| 2002/0019785 A1* | 2/2002 | Whitman | G06Q 10/087 | 705/28 |
| 2002/0069137 A1* | 6/2002 | Hiroshige | G06Q 10/08 | 705/308 |
| 2002/0123814 A1* | 9/2002 | Bickley | G05B 19/4183 | 700/99 |
| 2002/0133416 A1* | 9/2002 | Abhyanker | G06Q 30/02 | 705/26.41 |
| 2003/0046180 A1* | 3/2003 | Chiu | G06Q 10/087 | 705/28 |
| 2003/0061128 A1* | 3/2003 | Lin | G06Q 10/087 | 705/29 |
| 2003/0130863 A1* | 7/2003 | Grey | G06Q 30/06 | 705/1.1 |
| 2003/0177123 A1* | 9/2003 | Edwards | G06Q 10/06 | |
| 2003/0233246 A1* | 12/2003 | Snapp | G06Q 10/04 | 705/37 |
| 2004/0039658 A1* | 2/2004 | Hume | G06Q 10/06 | 705/26.1 |
| 2004/0093287 A1* | 5/2004 | Gupta | G06Q 10/06 | 705/29 |
| 2004/0122728 A1* | 6/2004 | Keene | G06Q 10/06 | 705/400 |
| 2004/0148117 A1* | 7/2004 | Kirshenbaum | G01K 1/022 | 702/82 |
| 2004/0210334 A1* | 10/2004 | Tateishi | G06Q 10/06 | 700/106 |
| 2004/0236641 A1* | 11/2004 | Abbott | G06Q 10/04 | 705/28 |
| 2004/0254841 A1* | 12/2004 | Sakuma | G06Q 10/0631 | 705/22 |
| 2005/0015315 A1* | 1/2005 | Starkowsky | G06Q 10/06 | 705/28 |
| 2005/0091070 A1* | 4/2005 | Adgaonkar | G06Q 10/06 | 705/305 |
| 2005/0117918 A1* | 6/2005 | Kimura | G03G 15/553 | 399/8 |
| 2005/0137919 A1* | 6/2005 | Buckley | G06Q 10/06 | 705/7.25 |
| 2005/0216368 A1* | 9/2005 | Wechsel | G06Q 10/0837 | 705/28 |
| 2005/0222898 A1* | 10/2005 | Kumazawa | G06Q 30/0283 | 703/2 |
| 2005/0261954 A1* | 11/2005 | Aoyama | G06Q 10/08 | 705/7.31 |
| 2006/0106718 A1* | 5/2006 | Spellman | G06Q 10/00 | 705/50 |
| 2006/0136249 A1* | 6/2006 | Kagan | G06Q 10/30 | 705/308 |
| 2006/0190291 A1* | 8/2006 | Erickson | G06Q 10/06 | 705/28 |
| 2007/0156439 A1* | 7/2007 | Fyda | G06Q 10/06 | 705/308 |
| 2007/0174652 A1* | 7/2007 | Padilla | G06Q 10/08 | 714/1 |
| 2007/0299748 A1* | 12/2007 | Shorter | G06Q 10/08 | 705/28 |
| 2008/0015720 A1* | 1/2008 | Oyasato | G06Q 10/10 | 700/97 |
| 2008/0147490 A1* | 6/2008 | Najmi | G06Q 10/00 | 705/7.37 |
| 2008/0228305 A1* | 9/2008 | Wang | G06Q 10/06 | 700/109 |
| 2008/0306798 A1* | 12/2008 | Anke | G06F 8/61 | 705/7.26 |
| 2008/0306813 A1* | 12/2008 | Romansky | G06Q 30/02 | 705/14.1 |
| 2009/0143887 A1* | 6/2009 | Jones | G06Q 10/06 | 700/99 |
| 2009/0321511 A1* | 12/2009 | Browne | B03B 9/061 | 235/375 |

OTHER PUBLICATIONS

Altekin, Fatma Tevhide; "Profit Orientated Disassembly Line Balancing"; Thesis; Graduate School of Natural and Applied Sciences of the Middle East Technical University; Jan. 2005.

Souza, Gilvan C., et al.; "Time Value of Commercial Product Returns"; 2006.

Decroix, Gregory, et al.; "Managing an Assemble-to-Order System with Returns"; The Fuqua School of Business; Duke University; Oct. 2005.

Fleischmann, Moritz, et al.; "Quantitative Models for Reverse Logistics: a Review"; European Journal of Operational Research; No. 103; pp. 1-17; 1997.

* cited by examiner

ROUTING MANAGEMENT RULES 150

- Work Pool Profile — 310
- Reuse Strategy Rules — 320
- Work Pool -- Returned Inventory Asset Tracking — 330

FIG. 3A

MONITOR CONTROLS TABLE     340

| Date Window | Plant Code | Frequency | Exclusion Days | Description |
|---|---|---|---|---|
| 03/01/07 - 03/31/07 | 980 | Hourly | Sat., Sun. | Last Month of Q, Monitor M-F on the hour. Shut off adjusting weekends |

FIG. 3F

REUSE STRATEGY TABLE 320

| Reuse Strategy Name | Request | | | | | | Reuse Priority | | | Matching Reuse Attributes |
|---|---|---|---|---|---|---|---|---|---|---|
| | Return Area/Location | Return Type | Product Type | Product Model | Order Type | Product Request Key | Priority | Prioritized Pools | Recycle Time | |
| Reuse Strategy One | S&U Area | Shipped and Uninstalled | zSeries CEC | *ALL | NEW SERVER | <KEY 1> | 10 | 1. Reconfigure<br>2. Asset Conversion<br>3. Teardown | • 2 days<br>• 1 day<br>• *END | SET_1 |
| Reuse Strategy Two | S&U Area | Shipped and Uninstalled | zSeries CEC | *ALL | NEW SERVER | <KEY 2> | 20 | 1. Reconfigure | • *END | LOANER_SET |
| Reuse Strategy Three | CANCEL Area | Cancel | 9405 | 520 | NEW SERVER | <KEY 3> | 10 | 1. Resell<br>2. Teardown | • 2 days<br>• *END | NO_EXT_IO_SET |

FIG. 3B

REUSE ATTRIBUTES TABLE 325

| Set Name | Asset Age | Valid Date Range | Feature/Qty | Asset Costs | Work Unit Qty | BOM/Qty | Part Number/Qty | Customer Or BP | Country Code | Operations Complete | Quality Blocks | Loaner Order |
|---|---|---|---|---|---|---|---|---|---|---|---|---|
| SET_1 | | | | | | | | | | | | NO |
| LOANER_SET | | | Not 5094 | | | | | | | | | YES |
| NO_EXT_IO_SET | | | | | | | | | | | | NA |

FIG. 3C

WORK POOL PROFILE TABLE 310

| Pool Name | Pool Description | Work Pool Inventory Location | Work Pool Max Size | Threshold Notification | Self Adjust (Y/N) | Auto Notify | Contact |
|---|---|---|---|---|---|---|---|
| Reconfigure | Reconfigure the Unit | 107-5 : RC00001 | 100 | 90% | Y | Y | tigers@us.ibm.com |
| Resell Plant | Exact match - 007 | 007-5 : RC00002 | 30 | 100% | Y | Y | panthers@us.ibm.com |
| Resell GWC | Exact match - CSC | 683-1 : RS0005 | 30 | 100% | N | N | *NONE |
| Teardown | Disassembly this item | 007-T : TEARDN01 | 50 | 95% | Y | Y | heat@us.ibm.com |

FIG. 3D

WORK POOL OPERATIONAL TABLE 315

| Pool Name | Pool Description | Product Request Key | Work Pool Inventory Location | Product/ Asset | Prioritized Pools | Recycle Time | Timestamp when active | Event that Placed this Asset in the Pool |
|---|---|---|---|---|---|---|---|---|
| Reconfigure | Reconfigure the Unit | KEY 1 | 107-5 : RC00001 | <product identifier A> | 1. Reconfigure<br>2. Asset Conversion<br>3. Teardown | • 2 days<br>• 1 day<br>• *END | 10:10 AM 05/07/2007 | Reuse Strategy |
| Reconfigure | Reconfigure the Unit | KEY 1 | 107-5 : RC00001 | <product identifier B> | 1. Reconfigure<br>2. Asset Conversion<br>3. Teardown | • 2 days<br>• 1 day<br>• *END | 10:12 AM 05/07/2007 | Self Adjusting |

TIME PHASE WORK POOL MANAGEMENT FOR RETURNED INVENTORY ASSET ROUTING

BACKGROUND OF THE INVENTION

Statement of the Technical Field

The present invention relates to integrated supply chain management and more particularly to a reverse logistics management system that can automatically identify, prioritize and route returned inventory assets based on manufacturing priorities.

Description of the Related Art

Modern manufacturers are always in a state of flux, assembling and tearing down specialized products. These specialized products are produced specifically to the configuration requirements of a customer and are often referred to as one-of-a-kind configurations. The teardown may result from various events, including products built for extended failure analysis tests, products built for loaners for other parts of a company under a warranty period, or even products that were cancelled during the manufacturing process. One problem is that tearing down specialized products is costly, induces damage, impacts cycle time, and manufacturer capacity during peak manufacturing periods.

Some companies build up products as finished goods and put these goods into stock. These fixed stock items are then advertised for sale as fixed products with a defined released part number (PN). Some companies also resell cancelled inventory in a similar fashion. Other companies tear down most of the returned or specialized products back into purchased or subassembly components. Upon receipt of an order, the companies then build the new customer orders from these parts specifically to the customer configuration. These practices result in damaged components, additional scrap from one-time-used parts, and impacts resources during manufacturing peak production.

Regardless of why they occur, product returns complicate the management of production execution and inventory reuse by introducing an uncertain reverse flow of partially assembled assets and materials. This is particularly true when only a subset of the components of a product can be recovered for reuse. In such cases, managing component inventories to preserve a reasonable amount of balance among those components that are recovered and those that are not can be quite challenging. When the system produces multiple products that share components (some of which are recovered), the task becomes even more complex.

One of the current problems, which occurs when orders are canceled or returned to the manufacturing facility, is a significant impact to inventory availability for new orders; particularly, those orders where the configuration is highly complex. Although current industry standard inventory control systems can facilitate restoring the returned inventory to stock for re-use, numerous problems still remain. For example, excess inventory accumulates as the returned inventory restored to stock may not be immediately in demand. Miss-shipments occur even though short-part inventory exists in cancelled orders. Significant cost is incurred during attempts to manually manage the returned inventory, especially due to ever changing priorities in the manufacturing environment. Unnecessary inventory pulls are initiated from a second party warehouse (e.g., the hub) as well as the sub-optimal usage of the inventory that is recovered.

SUMMARY OF THE INVENTION

Embodiments of the present invention address deficiencies of the art in respect to routing returned inventory assets and provide a novel and non-obvious method, system and computer program product for routing returned inventory assets in a manufacturing environment. In an embodiment of the invention, a method for routing returned inventory assets in a manufacturing environment can be provided. The method can include defining attributes of work pools in the manufacturing environment, defining a set of reuse strategies for use in the manufacturing environment, receiving a returned inventory asset in the manufacturing environment and obtaining at least one attribute of the returned inventory asset, comparing the obtained at least one attribute of the returned inventory asset to the set of reuse strategies to select the reuse strategy to apply to the returned inventory asset and applying the selected reuse strategy to the returned inventory asset to assign the returned inventory asset to one of the work pools in the manufacturing environment.

In one aspect of the embodiment, the method can further include the transportation of the returned inventory asset to a temporary location other than the assigned work pool. In another aspect of the embodiment, the method further can include updating a returned inventory asset tracking record to indicate the assigned work pool.

In another preferred embodiment of the invention, a system for routing returned inventory assets in a manufacturing environment can be provided. The system can include a data store of returned inventory assets and work pools for storing the returned inventory assets. The system further can include a returned inventory asset routing engine communicatively coupled to a manufacturing system and the data store. The system further can include returned inventory asset routing logic. The logic can include program code enabled to define attributes of work pools in the manufacturing environment, to define a set of reuse strategies for use in the manufacturing environment, to receive one of the returned inventory assets in the manufacturing environment and obtain characteristics of the returned inventory asset, to compare the obtained characteristics of the returned inventory asset to the set of reuse strategies and to select a reuse strategy to apply to the returned inventory asset, to apply the selected reuse strategy to the returned inventory asset and to assign the returned inventory asset to one of the work pools.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to routing of returned inventory assets and provide a novel and non-obvious method, system and computer program product for routing returned inventory assets in a manufacturing environment, based on returned inventory asset attributes, work pool attributes and characteristics, and reuse attributes. In accordance with an embodiment of the present invention, attributes of work pools in a manufacturing environment can be defined. Also, a set of routing (e.g., reuse) strategies for use in the manufacturing environment can be defined. Thereafter, a returned inventory asset can be received in the manufacturing area and the attributes of the returned inventory asset can be obtained. The obtained attributes or characteristics of the returned inventory asset are compared to a set of routing strategies to select a reuse strategy. The selected reuse strategy is applied to the returned inventory asset and a work pool is assigned. The method can further include the transportation of the returned inventory asset to a temporary location other than the assigned work pool. In another aspect of the embodiment, the method further can include updating a returned inventory asset tracking record to indicate the assigned work pool.

In accordance with another embodiment of the present invention, a system to create new methods, models and set of algorithms to determine optimum routing (reuse) of returned inventory assets. The models allow for an automated and dynamic method to prioritize and find the "best use" of returned inventory assets based on fluctuating manufacturing and customer needs.

Figure 1:
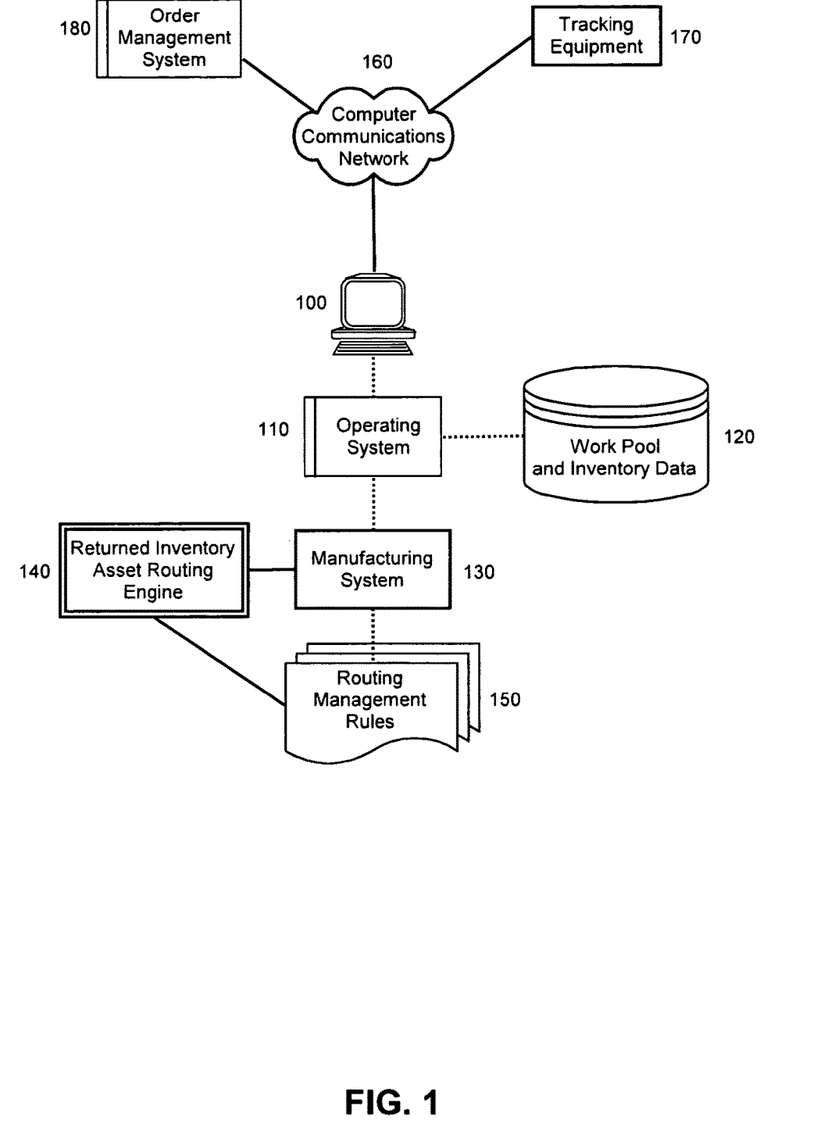
FIG. 1 is a schematic illustration of a manufacturing system utilizing a returned inventory asset routing engine.

In illustration, FIG. 1 is a schematic illustration of a manufacturing system utilizing a returned inventory asset routing engine. A computer 100 with an operating system 110 can be coupled to a database 120 of product management data including returned inventory asset information, product order attributes and work pool attributes and/or characteristics. A manufacturing system 130 can be coupled to a returned inventory asset routing engine 140. The routing management rules 150 can be coupled to the manufacturing system 130 and the returned inventory asset routing engine 140. The routing management rules 150 can enable the manufacturing system 130 or the returned inventory asset routing engine 140 to apply a routing (reuse) strategy based on numerous factors including but not limited to return area, return type, product type, product model and order type. The computer 100 can be coupled to order management system 180 and tracking equipment 170 via computer communications network 160 for receiving and tracking items from manufacturing and returned inventory distribution.

Figure 2:
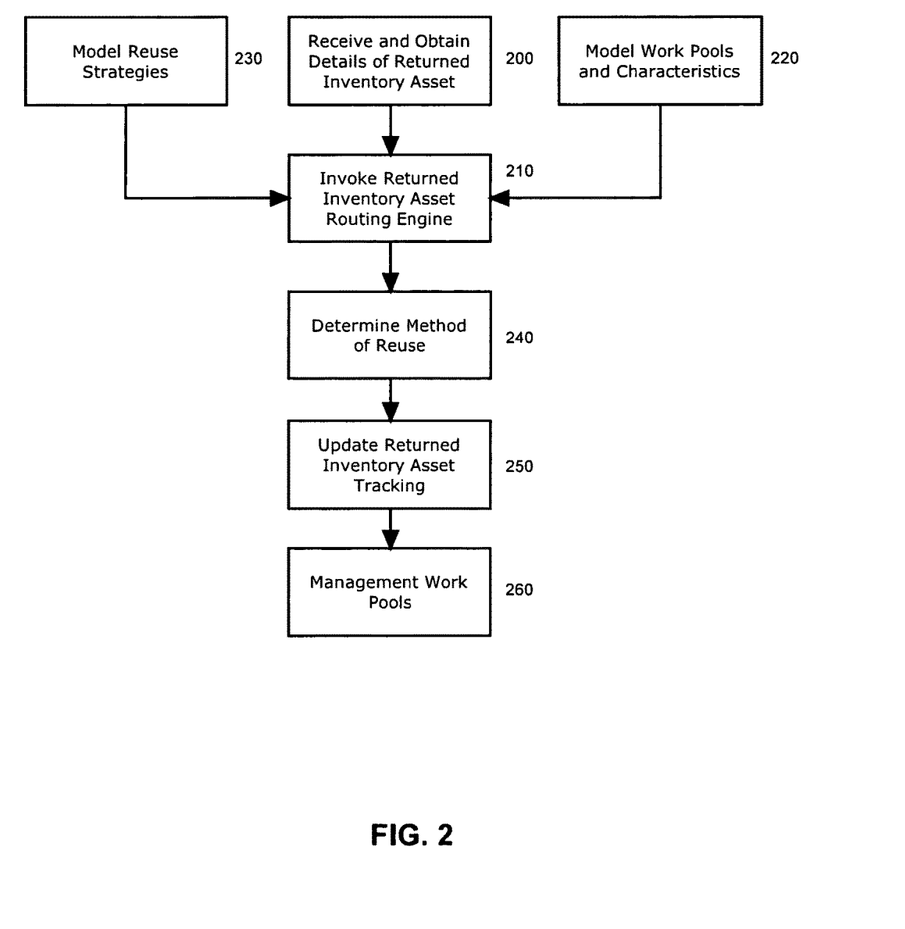
FIG. 2 is a flowchart illustrating a process for returned inventory asset routing and reuse analysis.

In further illustration, FIG. 2 is a flowchart illustrating a process for returned inventory asset routing and reuse analysis in a manufacturing supply chain process. In block 200, a returned inventory asset can be received from manufacturing or distribution and the details of the returned inventory asset can include return area/location, return type, product type, order type and the like. In block 210, the returned inventory asset routing engine 140 can be invoked by computer 100 or manufacturing system 130. In block 220, the returned inventory asset routing engine 140 can include work pool logic for modeling or defining a set of work pools in a manufacturing facility with their corresponding attributes and/or characteristics. In general, a work pool can be a collection of assets that were established as being appropriate for a particular user defined set of actions. These user defined set of actions are t actions defined by a business to best repurpose the asset in question. A work pool can have a logical work flow direction as well as a physical work flow location. In this way, the management and control of the flow among the work pools, e.g., the priority and sorting of actions on a work pool, can be business specific and remain under the control and management of the manager/application reading the returned inventory assets off the work pool. Typically, the modeling of the work pools will occur once, e.g., during an initialization stage of the system; however, the modeling can occur multiple times, e.g., at user-defined stages.

Additionally, in block 230, the returned inventory asset routing engine 140 can include reuse strategy logic for modeling a set of reuse strategies based on the attributes and/or characteristics of a returned inventory asset and any other user-defined parameters. The work pool logic and the reuse strategy logic can be coupled to the returned inventory asset routing engine 140 either directly as part of the computing system or remotely through an application programming interface (API) of the computing system. The reuse strategy logic can include program code enabled to analyze the returned inventory asset, its related attributes and/or characteristics and the available work pool attributes and/or characteristics in order to select a reuse strategy most responsive to that particular returned inventory asset. Typically, the modeling of the reuse strategies will occur once, e.g., during an initialization stage of the system; however, the modeling can occur multiple times, e.g., at user-defined stages.

In an embodiment of the system, returned inventory asset reuse (routing) logic can include program code enabled to define attributes of work pools in the manufacturing environment, to define a set of reuse (routing) strategies for use in the manufacturing environment, to receive one of the returned inventory assets in the manufacturing or return areas and obtain attributes and/or characteristics of the returned inventory asset, to compare the obtained attributes and/or characteristics of the returned inventory asset to the set of reuse (routing) strategies and select the reuse strategy to apply to the returned inventory asset, and to apply the selected reuse strategy to the returned inventory asset and assign the returned inventory asset to one of the work pools based on matching the obtained attributes of the returned inventory asset to the defined attributes of the one of the work pools. The returned inventory asset routing engine 140 is discussed in greater detail with reference to FIGS. 4 and 5. Routing management rules, reuse (routing) strategies, work pool profiles and attributes, returned inventory asset tracking and returned inventory asset attributes and/or characteristics are discussed in greater detail with reference to the tables of FIGS. 3A through 3F.

Figure 3A:
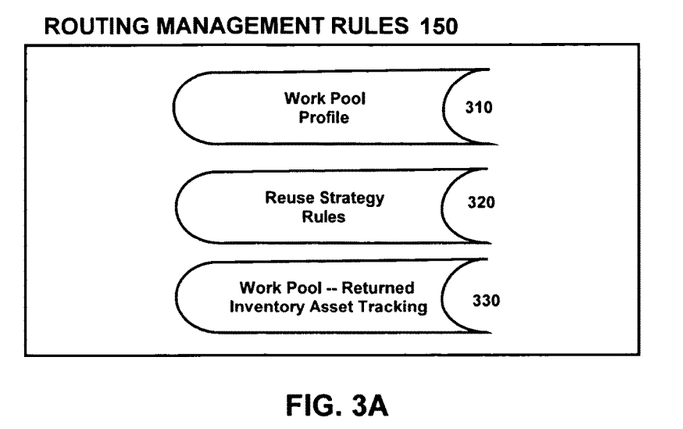
FIG. 3A is a block diagram illustrating routing management rules incorporated into the returned inventory asset routing and reuse analysis of FIG. 2.

FIG. 3A is a block diagram illustrating routing management rules 150 incorporated into the returned inventory asset routing and reuse analysis of FIG. 2. Block 310 of FIG. 3A contains the attributes and/or characteristics of work pools in a manufacturing environment. Block 320 in turn contains a set of reuse (routing) strategy rules. The reuse strategy rules 320 can be based on each returned inventory asset or product and the details of the returned inventory asset, which can include return area/location, return type, product type, order type and the like. Block 330 contains the work pool (returned inventory asset) tracking table. The work pool (returned inventory asset) tracking table is a transaction table that stores data for each returned inventory asset and its recommend/current work pool.

Figure 3B:
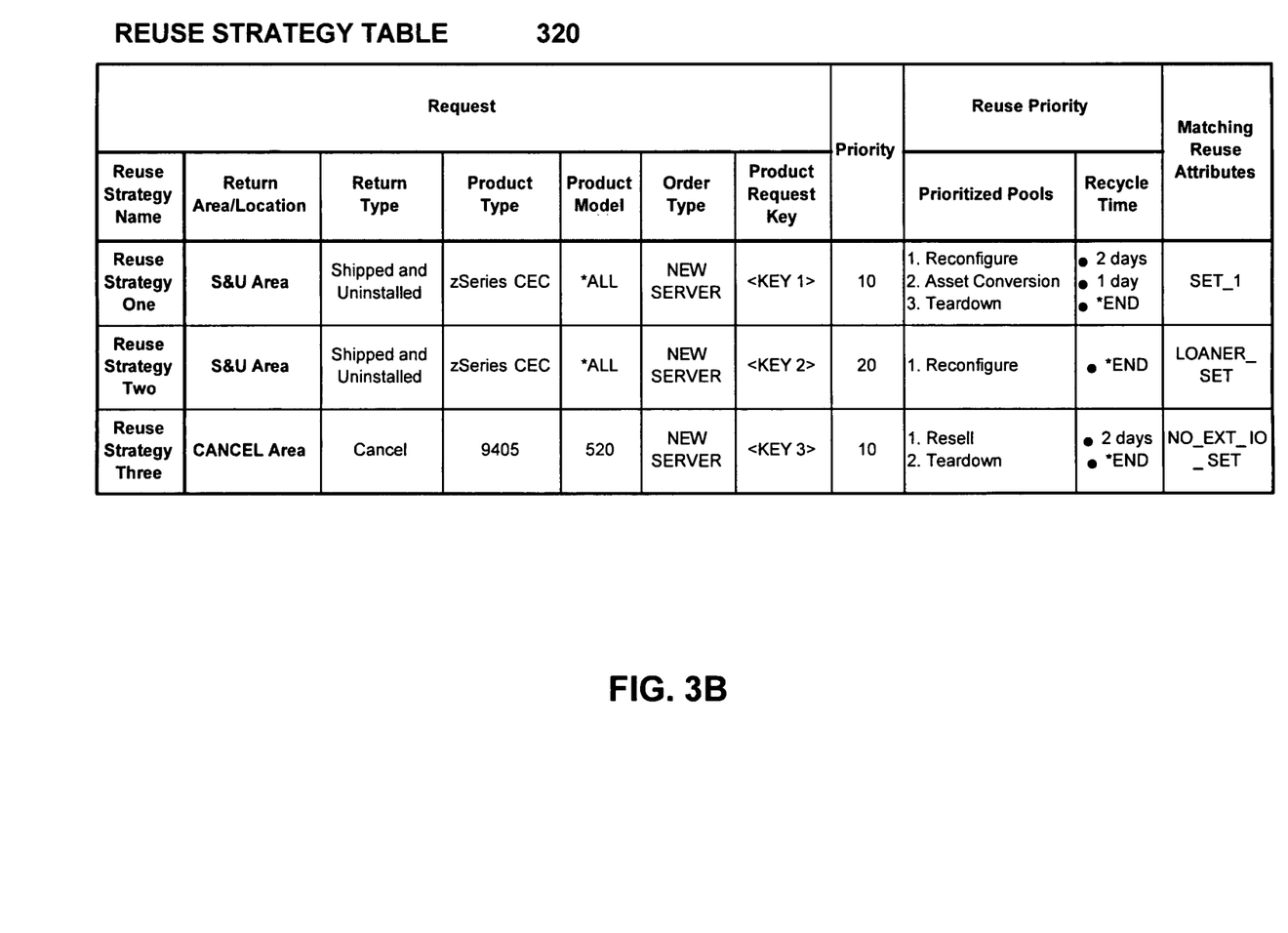
FIG. 3B is a block diagram illustrating reuse strategy rules incorporated into the returned inventory asset routing and reuse analysis of FIG. 2.

FIG. 3B is a block diagram illustrating reuse strategy rules incorporated into the returned inventory asset routing and reuse analysis of FIG. 2. For example, block 320 captures the return area/location, return type, product type, order type and other attributes. The mapping shown in block 320 is used by the returned inventory asset routing process to ensure that work pool optimization is maintained. Each row of the block 320 shows the data corresponding to a reuse strategy name, while each column shows one or more values associated with a returned inventory asset and attributes of a work pool. The first column of block 320 is populated with the reuse strategy name, such as "Reuse Strategy One" and "Reuse Strategy Two". The second column of block 320 is populated with the return area/location name, such as "S&U Area" which is a name that identifies a particular area or location which receives the returned inventory asset. In one embodiment, the second, third, fourth, fifth and sixth columns of block 320 indicated the return area/location, return type, product type, product model and order type of a particular request. Block 320 can further include a request key, priority value, prioritized pools, recycle time and matching reuse attributes identifier. The eighth column of block 320 is populated with a priority value, which is a numerical value that indicates relative order to process and compare the returned inventory asset to the indicated reuse strategy row. The use of the priority value can provide nuances to multiple valid rules to obtain the most finite or specific reuse strategy for a particular product and/or area. The ninth column of block 320 is populated with a list of prioritized pools, which is a list that can provide the order in which a returned inventory asset is to be routed through the work pools. The tenth column of block 320 is populated with an assigned recycle time, which can provide the time phase that the returned inventory asset is to remain in that specific prioritized pool before being removed, transferred or discarded. The eleventh column of block 320 is populated with a reuse attributes identifier, which can provide the corresponding reuse attributes record 325, that specifies a complete "match list", e.g., the complete detailed list of criteria, that should exist for selection of a particular reuse strategy, e.g., reconfigure, asset conversion, teardown, resell and the like.

Figure 3C:
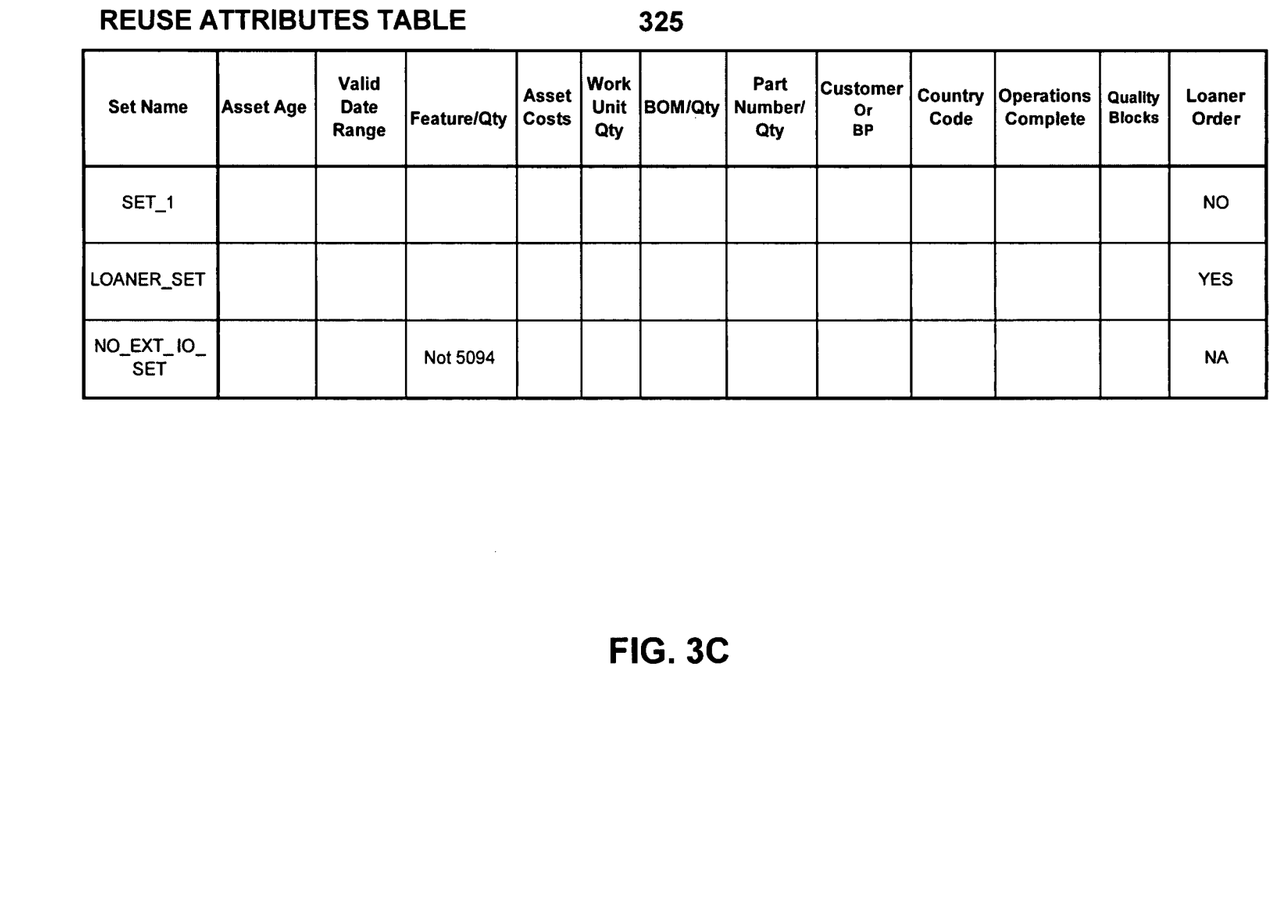
FIG. 3C is a block diagram illustrating reuse attributes rules incorporated into the returned inventory asset routing and reuse analysis of FIG. 2.

FIG. 3C is a block diagram illustrating reuse attributes incorporated into the returned inventory asset routing and reuse analysis of FIG. 2. For example, block 325 captures the set name, asset age, valid date range, feature/quantity, asset costs and loaner order status. In one embodiment, the first, second, third, fourth and fifth columns of block 325 indicated the set name, asset age, valid date range, feature/quantity, and asset costs, collectively the "reuse attributes" list for a defined returned inventory asset. The thirteenth column of block 325 is populated with a loaner order status, e.g., "NO", "YES" and not applicable "NA", which is a status identifier that indicates whether a returned inventory asset that has a particular loaner order attribute is permitted for processing with an indicated reuse strategy, e.g., for assignment to a particular work pool. For example, a returned inventory asset can include a loaner order status, e.g., "NO", "YES" and not applicable "NA" as a "reuse attribute" to be matched for determining whether to apply a particular "reuse strategy" to a received returned inventory asset.

In an embodiment, the reuse attribute records of block 325 work with Boolean logic that assumes "AND" positive logic only, and therefore all the attributes and/or characteristics of a given reuse attribute record are necessary for the selection of the corresponding reuse strategy. Other Boolean logic can be used to provide more complex relationships among the attributes. Although, block 325 illustrates a total of twelve attributes and/or characteristics for a given reuse attribute record, there may be more or less attributes and/or characteristics depending on a particular business's needs or requirements. Similarly for blocks 310, 315, 320 and 340, it is contemplated that more or less columns with corresponding control and/or data parameters can be provided as necessary to execute the routing and reuse process of FIG. 2.

Figure 3D:
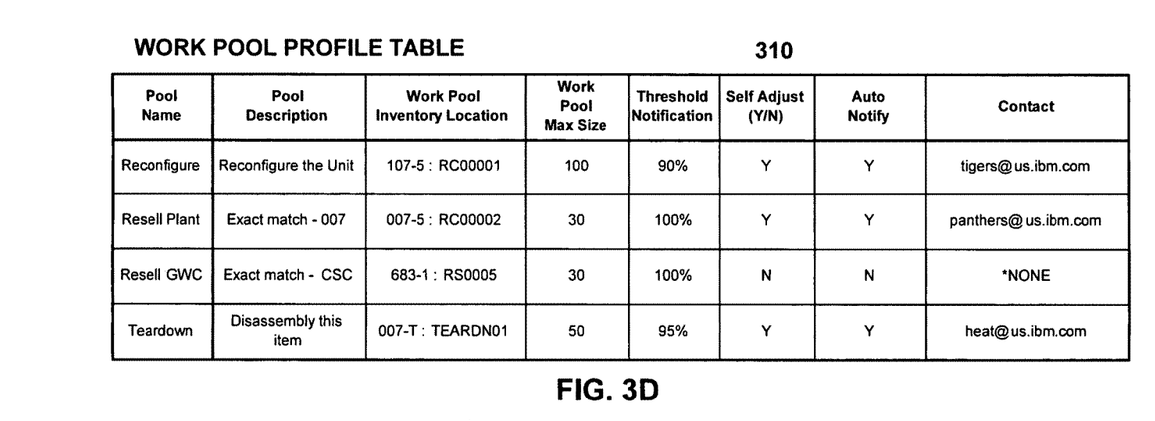
FIG. 3D is a block diagram illustrating work pool profiles incorporated into the returned inventory asset routing and reuse analysis of FIG. 2.

In further illustration, FIG. 3D is a block diagram illustrating work pool profile records, which are incorporated into the returned inventory asset routing and reuse analysis of FIG. 2. Work pool profile block 310 can be used to specify the attributes and/or characteristics of a given work pool including information such as the pool name, pool description, work pool inventory location, work pool maximum size and threshold notification. In addition, work pool profile block 310 can control allowance of work pool self-adjusting operation (sixth column), as well as electronic notification (seventh column), such as threshold or work pool changes. The work pool profile block 310 can be the primary master data control for the work pools defined within a manufacturing environment. In the first column of work pool profile block 310, the pool name can be user-defined, so as to enable the user to create as many pools as they desire to use in their particular business operations. In operation, the pool names are used to match, as well as setup, "Prioritized Pools" such as those prioritized pools illustrated in the ninth column of reuse strategy block 320 (FIG. 3B). Each column of work pool profile block 310 can correspond to a field of a work pool profile record. For example, the first column is populated with the pool name, e.g., "Reconfigure", "Resell Plant", "Resell GWC" and "Teardown", similar to the same entries in the first column of work pools block 315 of FIG. 3E and the ninth column of reuse strategy block 320. In embodiments, the work pool maximum size of the fourth column can be the defined maximum size of a given work pool at that particular work pool inventory location, e.g., a building and store location such as "107-5: RC00001". A threshold notification level, e.g., 90% of maximum work pool size, can be defined in the fifth column and used to determine when a notification of the work pool size should be transmitted to a particular contact, e.g., the user having the email address of "tigers@us.ibm.com" as illustrated in the eighth column of the first row of work pool profile block 310. A self-adjust indicator or flag as illustrated in the sixth column of work pool profile block 310, e.g., "Y", can be set and used to determine if the particular work pool can call a self-adjusting work pool management process to control the management of that work pool, for example to run one or more of the work pool management algorithms to update the work pool to remove those returned inventory assets that have timestamps that have expired.

Figure 3E:
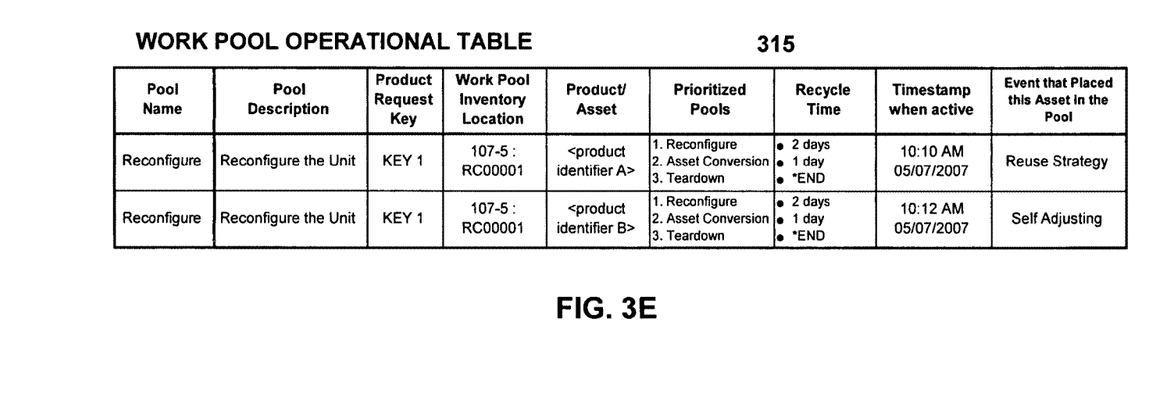
FIG. 3E is a block diagram illustrating work pool attributes and returned inventory asset attributes located in a work pool incorporated into the returned inventory asset routing and reuse analysis of FIG. 2.

In further illustration, FIG. 3E is a block diagram illustrating work pool attributes and returned inventory asset attributes located in a work pool, which are incorporated into the returned inventory asset routing and reuse analysis of FIG. 2. Work pool operational block 315 captures and contains a record of each returned inventory asset, e.g., <product identifier A>, <product identifier B>, etc., which has been dispositioned or routed to a specific work pool and the reason the returned inventory asset was sent to a particular work pool, e.g., product request key "KEY 1" of the third column of the first row of the work pool block 315. In embodiments, the prioritized work pools, recycle times, and product request keys of the third, sixth and seventh column of work pool block 315 are copied from the seventh, ninth and tenth columns of the reuse strategy block 320 to the work pool block 315 at the time the product/asset was sent to this particular work pool, e.g., "Reconfigure" pool name. Advantageously, this feature provides for the execution of the reuse strategy to continue even if the reuse strategy is later modified or changed. The eighth column of the work pools block 315 can contain a timestamp, e.g., "10:10 AM 05/07/2007", which indicates when a returned inventory asset was assigned or it became active in a particular work pool. The timestamp can be used by a work pool management function to adjust and move items that have expired in a particular work pool. For example, a self adjusting work pool manager can monitor the timestamps against the recycle times, e.g., where Pool Name=Prioritized Pool name, to automatically adjust and move items that have expired from that work pool. In this way, work pool block 315 can expand or shrink based on the returned inventory assets that are added and removed to/from a particular work pool.

For example, in the sixth column of work pool block 315, three prioritized pools are illustrated: 1. Reconfigure, 2. Asset Conversion and 3. Teardown. The corresponding recycle times are illustrated in the seventh column as: "2 days", "1 day" and "*END" respectively to the prioritized pools of the sixth column. In this example, a given returned inventory asset identifier, e.g., <product identifier A>, assigned to the work pool named "Reconfigure", would be placed into the first indicated work pool "Reconfigure" for a period of "2 days". After the period of 2 days, the returned inventory asset, e.g., <product identifier A>, is move to the next listed prioritized work pool, e.g. "Asset Conversion", where the returned inventory asset can be stored for a period, e.g., the recycle time, of "1 day". Once again the time stamp can be read and if the time period of 1 day has expired, the returned inventory asset can be moved to the third listed work pool, e.g., "Teardown", which has a corresponding recycle time of "*END". In this example, a recycle time of "*END" is defined to meet that the recycle period for the returned inventory asset will never expire, and the returned inventory asset will not be moved from the work pool corresponding to that recycle time value of "*END".

Figure 3F:
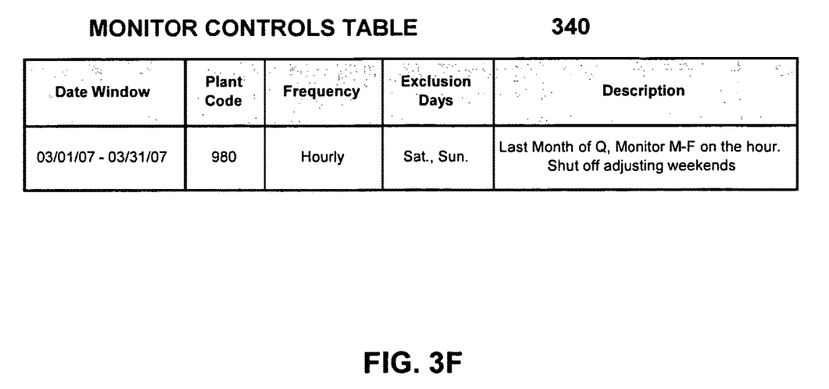
FIG. 3F is a block diagram illustrating monitoring control parameters incorporated into the returned inventory asset routing and reuse analysis of FIG. 2.

In still further illustration, FIG. 3F is a block diagram illustrating monitoring control parameters incorporated into the returned inventory asset routing and reuse analysis of FIG. 2. Monitor controls block 340 can be used to monitor the work pools and schedule when to execute the work pool manager, e.g., invoke the routing management and reuse strategy engine, on manufacturing system 130.

Figure 4:
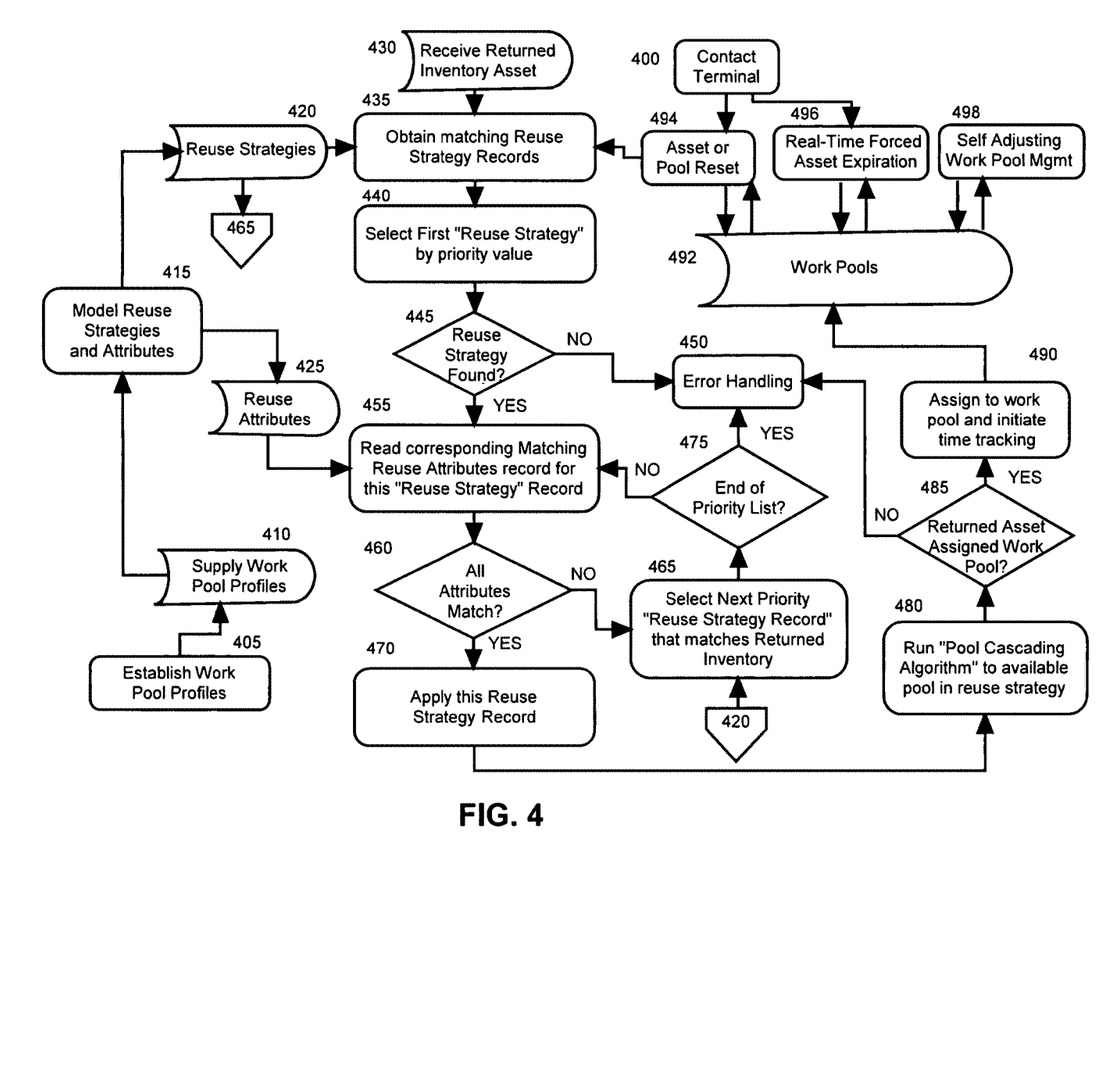
FIG. 4 is a flowchart illustrating a returned inventory asset routing process utilized by the returned inventory asset routing engine of FIG. 1.

In yet further illustration, FIG. 4 is a flowchart illustrating a returned inventory asset routing process utilized by the returned inventory asset routing engine 140 of FIG. 1. Beginning in block 405, a set of work pool profiles 310 in a manufacturing facility with their corresponding attributes and/or characteristics can be established or modeled and supplied to the returned inventory asset routing engine in block 410. In block 415, a set of reuse strategies 320 with their corresponding attributes and/or characteristics can be established or modeled and supplied to the returned inventory asset routing engine in block 420 and in block 465. Typically, the modeling of the work pool profiles 310 and the reuse strategies 320 will occur once, e.g., during an initialization stage of the system; however, the modeling can occur multiple times, e.g., at user-defined stages or when a request key is modified. In this way, new (or changed) reuse strategies can be used by the returned inventory asset routing engine 140 to process each returned inventory asset based on user-defined goals and parameters. In block 425, the new (or changed) attributes 325 for a particular reuse strategy can be made available to block 455.

In block 430, the presence of a returned inventory asset entering a manufacturing environment can be detected and the returned inventory asset's attributes can be obtained for comparison with a matching reuse strategy record from reuse strategy block 320. In embodiments, the analysis can check for matches of the return area/location, e.g., "S&U Area", "Cancel Area", etc.; return type, e.g., "Shipped and Uninstalled", "Cancel", etc.; product type, e.g., "zSeries CEC", "9405", etc.; product model, e.g., "520", "*ALL", etc.; and order type, e.g., "NEW SERVER", "MES", etc. in block 435. In block 440, a reuse strategy 320 can be selected based upon a priority value, e.g., "10" where the higher priority is based on having the lowest numerical value. For example, in the reuse strategy table of block 320, the first two reuse strategy entries, e.g., "Reuse Strategy One" and "Reuse Strategy Two", have priority values of "10" and "20", respectively. In this example, the "Reuse Strategy One" having the priority value of "10" would be selected and therefore the "Prioritized Pools" of the ninth column would be selected. In embodiments, the records are processed in priority order; however, if the reuse attributes return a "false" answer, then the next reuse strategy is obtained for continued processing. As illustrated, the Prioritized Pools for the Reuse Strategy One are: 1. Reconfigure, 2. Asset Conversion and 3. Teardown. Accordingly, the first reuse strategy, e.g., "Reconfigure" of the Prioritized Pools listed is selected. In decision block 445, a determination is made as to whether a reuse strategy was determined. If a reuse strategy was not determined, then in block 450, the process is sent to error handling. Otherwise, in block 455, the matching reuse attributes, e.g., for "SET_1", are retrieved from the matching reuse attribute block 325 and provided to decision block 460.

In decision block 460, the attributes of the returned inventory asset are compared to the retrieved matching reuse attribute record and if all the attributes of returned inventory asset match the attributes of the retrieved matching reuse attribute record, then in block 470, the first reuse strategy, e.g., "Reuse Strategy One", is applied to the returned inventory asset. Otherwise, in block 465, the next priority reuse strategy record, e.g., "Reuse Strategy Two" with a priority of "20" and matching reuse attributes of "LOANER_SET", that matches the returned inventory asset is selected. In decision block 475, a determination of whether the end of the priority list, e.g., whether there are any additional Reuse Strategy entries in the reuse strategy block 320, and if at the end of the priority list, then proceed to error handling block 450. Otherwise, if not at the end of the priority list, the matching reuse attributes record 325, e.g., "LOANER_SET", is retrieved in block 455 and in block 460, the attributes of the returned inventory asset are compared to the retrieved matching reuse attribute record. If all the attributes of returned inventory asset match the attributes of the retrieved matching reuse attribute record, then in block 470, the next priority reuse strategy, e.g., "Reuse Strategy Two", is applied to the returned inventory asset, and the returned inventory asset can be assigned to a work pool from the prioritized list of work pools illustrated in the eighth column of the reuse strategy block 320. In block 480, a work pool cascading algorithm, e.g., the work pool cascading process illustrated in FIG. 5 can be applied to an available work pool having the Reconfigure reuse strategy.

Various reuse strategies, which also can be referred to as "reverse logistics" algorithms, can be utilized in the returned inventory asset routing and reuse analysis process. In the above example, a "Reconfigure" reverse logistic action was discussed. The Reconfigure action can be where a product, e.g., a processor loaded with a particular set of code, that is already assembled is "reconfigured" to meet another demand, e.g., an order on the books can be satisfied by using an existing pre-assembled inventory item. In the above example, an "Asset Conversion" also reverse logistic action was discussed. The Asset Conversion can be where order assets are converted to stockable build-to-plan (BTP) assets for speculated reuse purposes. For example, a cancelled order can have components of the order added or removed to provide for conditioned configurations for future demands. Although there is currently no order demand, history indicates certain higher level configurations are highly likely to be reused. Another reverse logistic action mentioned is a "Teardown". A Teardown action can be where the order configuration is a low volume demand product and the desire is to return the parts to the supply chain as quickly as possible for other demands. Still another reverse logistic action is a "Part Harvest". A Part Harvest action can be where an outbound order needs a highly critical part and the returned inventory asset contains that highly critical part. Still another reverse logistic action is a "Resell". A Resell action can be where a product is already assembled and there is no or little additional manufacturing activity required to meet a sale. Still yet another reverse logistic action is an "Orphaning". An Orphaning action can be where complex manufactured products, e.g., an order that has multi-rack solutions, which as a full set has a low probability of reuse. Advantageously, the invention provides for additional user-defined reuse strategies and/or "reverse logistics" algorithms, which can be utilized in the returned inventory asset routing and reuse analysis process. For example, subsequent actions can be customized and modeled per a businesses' demands. The strategy and work pool names also can be user-definable so they can align with the actions that a particular business desires to take.

In decision block 485, a determination of whether the returned inventory asset was assigned to a work pool from the prioritized list of the reuse strategy block 320 is made. If the returned inventory asset was not assigned to a work pool from the prioritized list of the reuse strategy block 320, then the process can proceed to error handling block 450. Otherwise, the returned inventory asset can be routed to the assigned work pool block 492 and given a time stamp, which can be used in a time-phased management of the returned inventory asset. For example, as illustrated in work pool operational block 315 of FIG. 3E, the returned inventory asset, e.g., "product identifier A" can be assigned to a work pool name, e.g., "Reconfigure" along with the event that assigned or placed this returned inventory asset in the work pool, e.g., a reuse strategy (column 9 of work pool operational block 315), its timestamp when active, e.g., "10:10 AM 05/07/2007" (column 8 of work pool operational block 315), its work pool inventory location, e.g., "107-05: RC00001" (column 4 of work pool operational block 315) and its "Product Request Key", e.g., "KEY 1" (column 3 of work pool operational block 315). After assignment and delivery to assigned work pool block 492, the time-phased management of the work pools can be implemented. For example, returned inventory asset routing engine 140 can be invoked to manage the placement of the returned inventory asset among the work pools 492 by calling one of the work pool management algorithm blocks 480, 494, 496 and 498. In block 400, a contact terminal can receive notification of changes or modifications to any of the work pools 492. For example, the pool cascading algorithm of block 480 and the asset/pool reset algorithm of block 494 can transmit an email message to contact terminal block 400, to indicate a transfer of returned inventory items from one work pool to another work pool.

Figure 5:
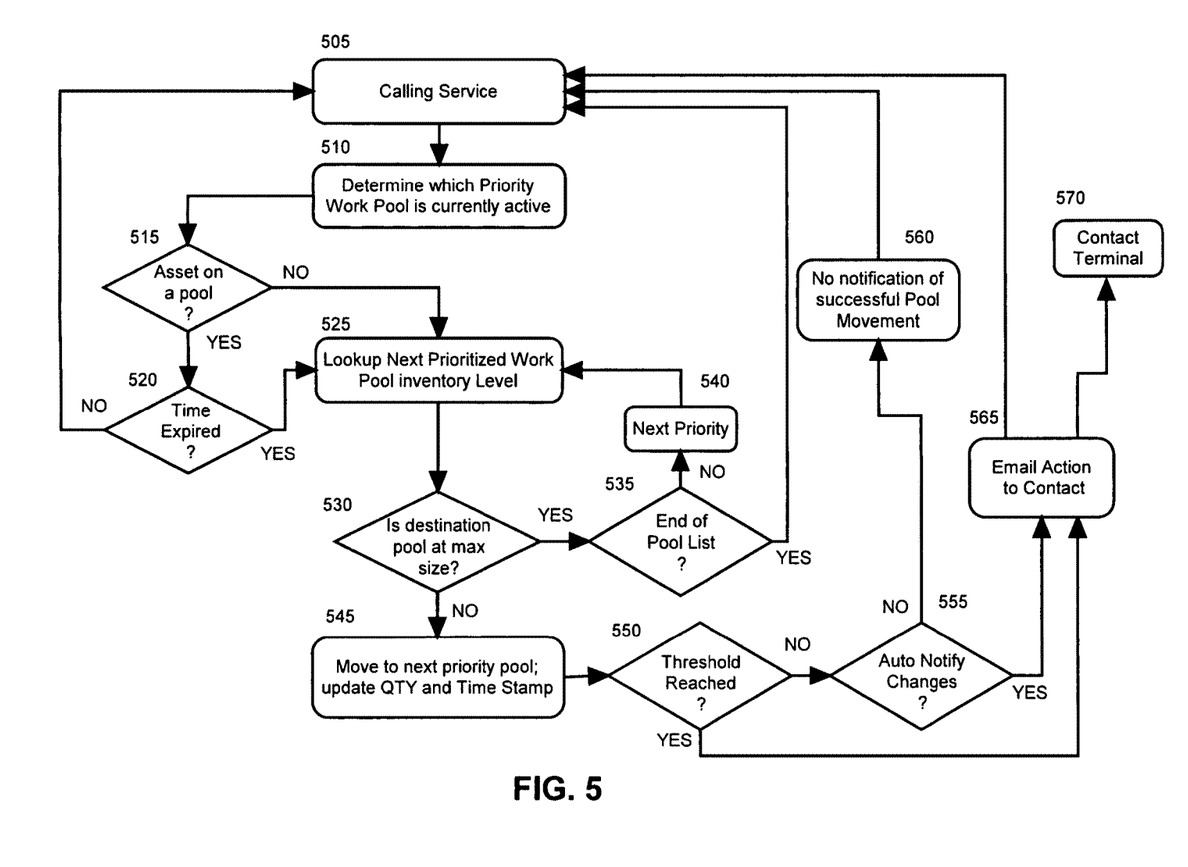
FIG. 5 is a flowchart illustrating a work pool cascading management process utilized by the returned inventory asset routing engine of FIG. 1.

In still further illustration, FIG. 5 is a flowchart illustrating a work pool cascading management process, which can be utilized by the returned inventory asset routing engine of FIG. 1. Beginning in block 505, a service that calls the pool cascading process, e.g., the original reuse algorithm or the self-adjusting algorithm, generates a request. In block 510, a determination of the current active priority work pool can be made. In decision block 515, work pool records can be read to determine whether a returned inventory asset is identified on an existing work pool record and if so, in decision block 520, a determination of whether the returned inventory asset's time for remaining in the current work pool has expired. For example, expiration of the time occurs when the "current time" minus the "timestamp" is greater than the recycle time corresponding to the returned inventory asset, e.g., "product identifier A" of work pool operational block 315. If the returned inventory asset's time for remaining in the current work pool has not expired then no adjustment is needed and the process can return to block 505. Otherwise, if time has expired, then an adjustment is needed and in decision block 525 the inventory level of the next priority work pool in the prioritized list can be retrieved or looked-up.

Returning to decision block 515, if the returned inventory asset is not on an existing work pool, e.g., identified in an existing work pool record, then the returned inventory asset is "new" to the current work pool and in decision block 525, the inventory level of the next priority work pool in the prioritized list can be retrieved or looked-up. In decision block 530, a determination of whether the next priority work pool in prioritized list is at its maximum size can be made, and if the maximum size of the next priority work pool in prioritized list has been reached, then in decision block 535, a determination of whether the end of the prioritized list of work pools was reached can be carried out. If the end of the prioritized list of work pools was reached, then no adjustment for this returned inventory asset is available as no valid work pool was identified and the process can return to the calling service in block 505. In contrast, if the end of the prioritized list of work pools has not been reached, then in block 540, the next priority work pool in the prioritized list can be obtained and its corresponding inventory level can be retrieved at block 525. If the maximum size of the next priority work pool has not been reached, then in block 545, the returned inventory asset can be moved to the next priority work pool and the quantity of inventory assets for that next priority work pool can be updated along with the corresponding time stamp, e.g., each can be updated in corresponding work pool, e.g., in the work pool record of work pool operational block 315. In embodiments, the received inventory asset can be moved to an "in-transit" or temporary work pool location before moving the received inventory asset is moved to the next priority work pool. Accordingly, the received inventory asset could remain in the "in-transit" location until authorized personnel are dispatched to transport it to the destination priority work pool. In embodiments, the "in-transit" or temporary work pool location can be a logical location with no actual physical movement as described above.

In embodiments, the work pool cascading management process can further include generating a user-definable threshold notification based on conditional triggering events, e.g., generating a notification that the work pool size has reached 90% of the work pool maximum size at decision block 550. In decision block 555, a determination of whether notification of changes or modifications to work pools can be automatically generated. If automatic notification of changes or modifications to work pools is not permitted, then at block 560, the movement of the returned inventory asset is completed successful; however, no notification of this movement is provided to the contact terminal at block 570. Otherwise, at block 565, threshold automatic notification and successful movement of returned inventory asset can be provided to the contact terminal at block 570 and to the calling service at block 505.

In embodiments, an asset and/or work pool reset algorithm can be provided for managing the work pools. In an asset and/or work pool reset algorithm, a user and/or a pool management service can send a request to reset an asset or an entire work pool. A search of the various work pools for the specific asset can be performed. If the specific asset is found on a work pool, it can be deleted from that work pool and sent back to the time-phased returned inventory asset routing and reuse process of FIG. 4 for processing. Alternatively, or in addition to, if reset request is for an entire work pool, then each of the returned inventory assets of that work pool can be moved to a temporary work pool, deleted from the designated work pool and sent back to the time-phased returned inventory asset routing and reuse process of FIG. 4 for processing.

In embodiments, a real-time forced asset expiration algorithm can be provided for managing the work pools. In a real-time forced asset expiration algorithm, a user and/or a pool management service desiring to expire a current work pool, e.g., a reconfigure work pool, and move a returned inventory asset to a next priority work pool or stage, can send a request to reset an asset or an entire work pool. A search of the various work pools for the specific returned inventory asset can be performed and if the specific returned inventory asset is located, then the returned inventory asset can be updated by setting the recycle time, e.g., "RECYCLE TIME", to expired, e.g., "EXPIRED" for the prioritized work pool entry that matches this work pool. The real-time forced asset expiration algorithm can further include calling a pool cascading algorithm, such as the "Pool Cascading Algorithm" illustrated in FIG. 5. In embodiments, a self-adjusting work pool management algorithm can be provided for managing the work pools. In a self-adjusting work pool management algorithm, a pool management service can request that a work pool manager, e.g., a monitor, be invoke or run on itself to update its own work pool. For example, if monitor controls are provided to a work pool, then the monitor can be initialized and can load various monitor parameters before the monitor "awakens" or is evoked as a result of a "scheduled runtime", which can be based on a defined date, time and manufacturing plant, such as those parameters illustrated in the first, second, third and fourth columns of the monitor controls block 340 as illustrated in FIG. 3F. Each valid work pool and its respective management controls, e.g., those work pools having an self-adjusting indicator that is on, e.g., "Y", as illustrated in the seventh column of work pool profile block 310 of FIG. 3D, can be processed by the self-adjusting work pool management algorithm. In embodiments, the returned inventory assets of a first work pool can be read a pool cascading algorithm, such as the "Pool Cascading Algorithm" illustrated in FIG. 5 can be call to process each of the returned inventory assets of a first work pool. In a similar manner, the pool cascading algorithm can be evoked for any remaining work pools that included the self-adjust on identifier.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method, using a computer hardware system, for routing returned inventory assets in a manufacturing environment, the method comprising:
   defining, using the computer hardware system, attributes of work pools in the manufacturing environment;
   defining, a table in memory of the computer hardware system, and inserting records into the table specifying a set of reuse strategies for use in the manufacturing environment, the records comprising one or more data fields characterizing a return request of a product and one or more corresponding data fields characterizing a manner of reuse of the returned product including an order in which the returned product is to be routed through one or more of the work pools;
   receiving, using the computer hardware system, a returned inventory asset in the manufacturing environment and obtaining at least one attribute of the returned inventory asset;
   comparing, using the computer hardware system, the obtained at least one attribute of the returned inventory asset to the one or more data fields characterizing the return request of the product in the table to select a reuse strategy of the corresponding manner of reuse of the returned product to apply to the returned inventory asset;
   applying, using the computer hardware system, the selected reuse strategy to the returned inventory asset to assign the returned inventory asset to one of the work pools in the manufacturing environment;
   creating, using the computer hardware system, a work pool profile for at least one of the work pools; and,
   defining, using the computer hardware system, a work pool name, a work pool description, a work pool inventory location and a work pool maximum size for the work pool profile;
   updating a returned inventory asset tracking record to indicate the assigned work pool;
   setting a work pool identifier flag to indicate an assignment to the work pool and also a self-adjust flag to determine when the work pool is able to call a self-adjusting work pool management process to control management of the work pool; and,
   assigning the returned inventory asset to a work pool having a logical location.

2. The method of claim 1, further comprising transporting the returned inventory asset to a temporary location other than the assigned work pool.

3. The method of claim 1, further comprising transporting the returned inventory asset to the assigned work pool.

4. The method of claim 1, further comprising analyzing the returned inventory asset tracking record for a work pool identifier, and prohibiting a second assignment of the returned inventory asset to the work pool having the work pool identifier that matches the work pool identifier flag.

5. The method of claim 1, wherein comparing the obtained at least one attribute of the returned inventory asset to the set of reuse strategies to select a reuse strategy to apply to the returned inventory asset comprises selecting a reuse strategy based upon a priority value.

6. The method of claim 1, further comprising obtaining an automatic notify identifier from the returned inventory asset; verifying and if the obtained automatic notify identifier is turned on; and, automatically transmitting an auto notification to a contact terminal.

7. The method of claim 1, further comprising:
   sending a request to expire a returned inventory asset activity;
   setting a recycle time of the returned inventory asset to an expired state; and,
   transitioning the returned inventory asset to the next returned inventory asset activity designated by a reuse strategy record.

8. A system for routing returned inventory assets in a manufacturing environment, the system comprising:
   a data storage device configured to store manufactured items and work pools for storing the returned inventory assets;
   an returned inventory asset routing engine, executing as a processor of a computer hardware system, the returned inventory asset routing engine communicatively coupled to a manufacturing system and the data storage device; and
   returned inventory asset routing logic comprising program code, when executed on the processor of the computer hardware system, causes the returned inventory asset routing engine to define attributes of work pools in the manufacturing environment, to define a table in memory and inserting records into the table specifying a set of reuse strategies for use in the manufacturing environment, the records comprising one or more data fields characterizing a return request of a product and one or more corresponding data fields characterizing a manner of reuse of the returned product including an order in which the returned product is to be routed through one or more of the work pools, to receive one of the returned inventory assets in the manufacturing environment and obtain characteristics of the returned inventory asset, to compare the obtained characteristics of the returned inventory asset to the one or more data fields characterizing the return request of the product in the table and select a reuse strategy of the corresponding manner of reuse of the returned product to apply to the returned inventory asset, to apply the selected reuse strategy to the returned inventory asset to assign the returned inventory asset to storage in one of the work pools, and to create a work pool profile for at least one of the work pools and to define a work pool name, a work pool description, a work pool inventory location and a work pool maximum size for the work pool profile, to update a returned inventory asset tracking record to indicate the assigned work pool, to set a work pool identifier flag to indicate an assignment to the work pool and also a self-adjust flag to determine when the work pool is able to call a self-adjusting work pool management process to control management of the work pool, and to assign the returned inventory asset to a work pool having a logical location.

9. The system of claim 8, wherein the system for routing returned inventory assets in a manufacturing environment is further configured to transport the returned inventory asset to a temporary location other than the assigned work pool.

10. The system of claim 8, wherein the system for routing returned inventory assets in a manufacturing environment is further configured to generate a timestamp for a returned inventory asset based upon the assignment of the returned inventory asset to the work pool and to move the returned inventory asset out of the work pool based upon a recycle time value update a returned inventory asset tracking record to indicate the assigned work pool.

11. A non-transitory computer program product comprising a computer usable storage medium comprising a memory device having stored therein computer usable program code for routing returned inventory assets in a manufacturing environment, the computer usable program code, which when executed on a computer hardware system, causes the computer hardware system to perform:
defining attributes of work pools in the manufacturing environment;
defining a table in memory of the computer hardware system and inserting records into the table specifying a set of reuse strategies for use in the manufacturing environment, the records comprising one or more data fields characterizing a return request of a product and one or more corresponding data fields characterizing a manner of reuse of the returned product including an order in which the returned product is to be routed through one or more of the work pools;
receiving a returned inventory asset in the manufacturing environment and obtaining at least one attribute of the returned inventory asset;
comparing the obtained at least one attribute of the returned inventory asset to the one or more data fields characterizing the return request of the product in the table to select a reuse strategy of the corresponding manner of reuse of the returned product to apply to the returned inventory asset;
applying the selected reuse strategy to the returned inventory asset to assign the returned inventory asset to one of the work pools in the manufacturing environment
creating a work pool profile for at least one of the work pools; and,
defining a work pool name, a work pool description, a work pool inventory location and a work pool maximum size for the work pool profile;
updating a returned inventory asset tracking record to indicate the assigned work pool;
setting a work pool identifier flag to indicate an assignment to the work pool and also a self-adjust flag to determine when the work pool is able to call a self-adjusting work pool management process to control management of the work pool; and,
assigning the returned inventory asset to a work pool having a logical location.

12. The computer program product of claim 11, wherein the computer usable program code further causes the computer hardware system to perform transporting the returned inventory asset to a temporary location other than the assigned work pool.

13. The computer program product of claim 11, wherein the computer usable program code further causes the computer hardware system to perform obtaining an automatic notify identifier from the returned inventory asset;
verifying and if the obtained automatic notify identifier is turned on; and, automatically transmitting an auto notification to a contact terminal.

14. The computer program product of claim 11, wherein the computer usable program code further causes the computer hardware system to perform sending a request to expire a returned inventory asset activity;
setting a recycle time of the returned inventory asset to an expired state; and,
transitioning the returned inventory asset to the next returned inventory asset activity designated by a reuse strategy record.

15. The computer program product of claim 11, wherein the computer usable program code further causes the computer hardware system to perform
generating a timestamp for a returned inventory asset based upon the assignment of the returned inventory asset to the work pool; and,
moving the returned inventory asset out of the work pool based upon a recycle time value.

16. The method of claim 1, further comprising
generating a timestamp for a returned inventory asset based upon the assignment of the returned inventory asset to the work pool; and,
moving the returned inventory asset out of the work pool based upon a recycle time.

* * * * *